United States Patent [19]

Husted

[11] 4,204,581
[45] May 27, 1980

[54] SNOWFOIL SKI-BOB

[75] Inventor: Royce H. Husted, Wheaton, Ill.

[73] Assignee: Saroy Engineering, Wheaton, Ill.

[21] Appl. No.: 872,688

[22] Filed: Jan. 26, 1978

[51] Int. Cl.² ..................... B62B 13/14; B62M 27/02
[52] U.S. Cl. ................................ 180/190; 280/11.115
[58] Field of Search ................. 180/5 R; 280/11.11 E

[56] References Cited
U.S. PATENT DOCUMENTS

| 3,610,356 | 10/1971 | Byar | 180/5 R |
| 3,682,495 | 8/1972 | Zaimi | 180/5 R |

Primary Examiner—Richard A. Bertsch
Attorney, Agent, or Firm—Samuel Shiber

[57] ABSTRACT

A power driven ski-bob comprising a front steerable ski and a motor driven propulsion unit which are connected to the rest of the ski-bob's structure by struts, so that the rider and motor move above the snow to minimize the drag of the snow on the ski-bob.

3 Claims, 3 Drawing Figures

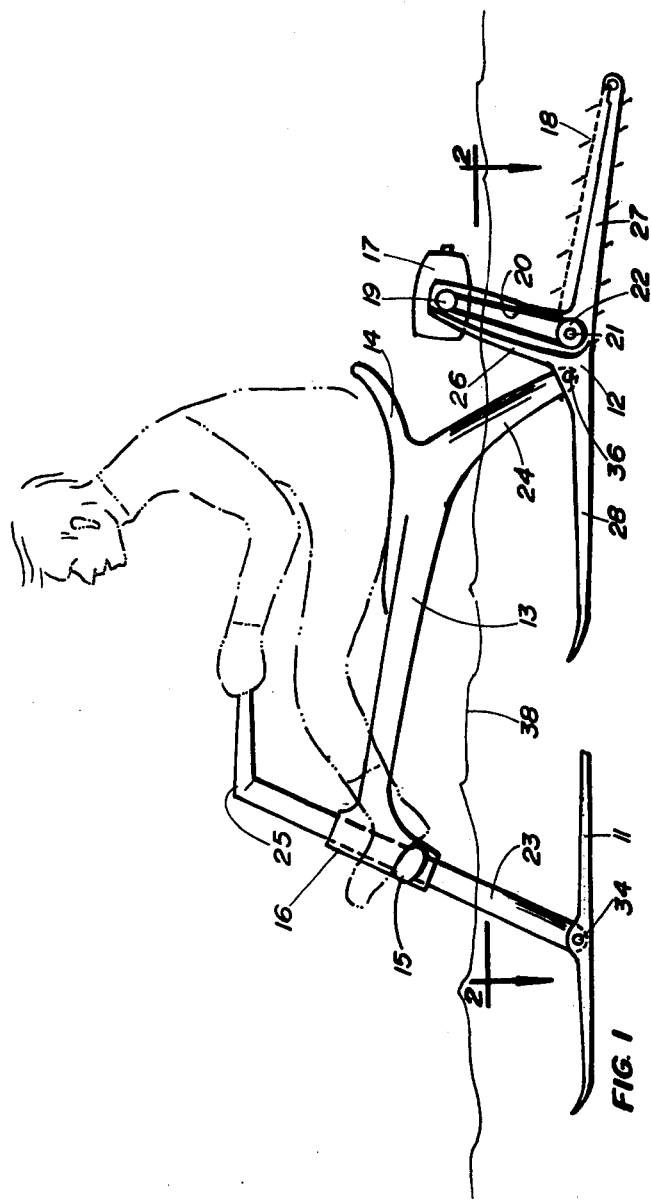
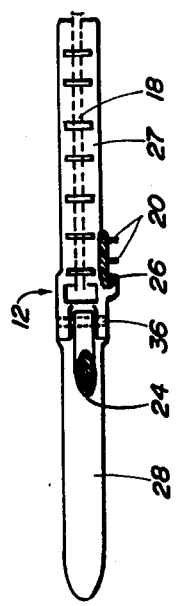
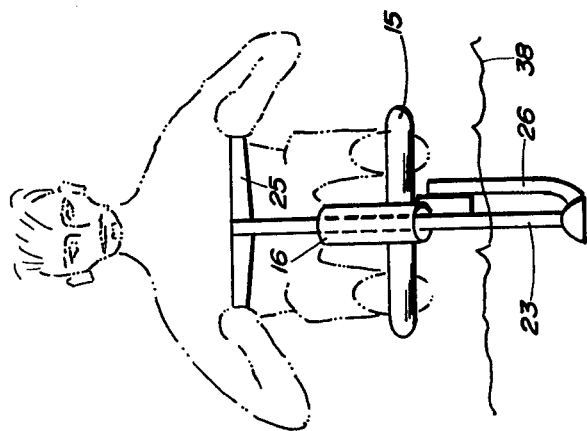

SNOWFOIL SKI-BOB

BACKGROUND OF THE INVENTION

The background of the present invention is found mostly in the art of vehicles travelling in a water medium, which I will briefly review, since some of the thinking and concepts carry over to the present invention which deals with the construction of hydrofoil type of vehicle for travelling in a snow medium.

A hydrofoil vehicle is characterized by foils which contact the medium (be it water or snow) and support the main body of the vehicle through strut means, above the medium. Both the foils and the struts have a limited frontal area and the foils are additionally characterized by having a substantial under surface area for supporting the vehicle against the medium. Thus, the drag developed between the vehicle and the medium is minimized.

This theory was well established back in 1898 when the first hydrofoil boat was built and tested. In 1918 the eminent Alexander Graham Bell built and tested a hydrofoil boat, and achieved a record speed of 70 m.p.h.

Further reference on a hydrofoil system per se can be found in a Report on Hydrofoil Development submitted on June 27, 1960 to the U.S. House of Representatives, 86th Congress—2nd Session by its Committee on Science and Astronautics, and printed by the Govt. Printing Office, which is herein incorporated by reference.

To put the present invention in perspective it may be proper to analyze some unique aspects of the ski-bob (throughout the test of this application the term "ski-bob" will mean a power driven ski-bob, and the term snowfoil ski-bob will means a ski-bob incorporating the present invention).

Designing a ski-bob bares some similarities to designing an airplane, that is, it is important to optimize the various design parameters since over-designing cannot be tolerated. For example, if the drag characteristics (the resistance developed by the snow on the propagation of the ski-bob) are not minimized, a larger tread and engine will be called for, requiring in-turn a heavier, bulkier frame which in turn further increases the drag. Eventually, this mutual degeneration of design parameters leads to having a bulky vehicle like a snowmobile which weighs approximately 500 pounds and commonly uses a 40 horsepower engine in contrast to a ski-bob which weighs only about 35 pounds and which can be propelled by a 3½ horsepower engine.

Thus, an affect of the present invention is to teach an important improvement for minimizing the drag imposed by soft snow on a ski-bob.

SUMMARY OF THE PRESENT INVENTION

The present invention relates to light snow going vehicles, particularly to a ski-bob.

A snowfoil ski-bob comprises a front steerable ski and a motor driven propulsion unit which are connected to the rest of the ski-bob by struts. The ski, the propulsion unit and the struts all have a limited frontal area and in addition the ski and propulsion unit are characterized by having a substantial under surface area for contacting the snow. The rider, the motor and other parts of the ski-bob which have a substantial frontal area are elevated by the struts above the snow, so that when moving through snow they do not develop drag against the snow.

BRIEF DESCRIPTION OF THE DRAWINGS

FIG. 1 Shows a side view of a snowfoil travelling in soft snow;

FIG. 2 Shows a top view of the snowfoil ski-bob, sectioned along line 2—2 marked on FIG. 1, and;

FIG. 3 Shows a front view of the snowfoil ski-bob.

DETAILED DESCRIPTION OF THE DRAWINGS

Shown in the FIGS. in a snowfoil ski-bob 10 which is particularly suitable for travelling in soft snow (numeral 38 indicates a snow line). The unit comprises a front steerable ski 11 and a rear propulsion unit 12 such as, for example, a power driven ski as shown in my U.S. Pat. No. 3,853,192, preferably with improvements shown in my U.S. co-pending patent application Ser. No. 793,728 now U.S. Pat. No. 4,129,193, both of which are herein being incorporated by reference. The ski 11 and the propulsion unit 12 are characterized by a limited frontal area and a substantial under surface area for contacting the snow. A frame 13 incorporating a seat 14, leg pegs 15 and a bearing section 16. A motor 17 drives an endless tread 18 through centrifugal clutch 19, a belt 20, a pully 22, a shaft 21 and a sprocket (not shown) which engages with the tread 18. For additional information on the construction of the propulsion unit 12 per se, please refer to my previously mentioned U.S. patent.

A strut 23 is pivotly connected to the front steerable ski by a pin 34 at one end, and to handle-bar 15 at its other end while being rotatebly supported at its midsection by the bearing 16 (similar to a bicycle front fork). A rear strut 24 which is part of the frame 13 is pivotly connected to the propulsion unit 12 through a pin 36. The motor 17 is mounted to a motor strut 26 which is connected to a body 27 of the propulsion unit 12. The struts 23, 24 and 26 have a limited narrow frontal area and are streamlined (note the struts' cross section shown in FIGS. 2) so as to minimize their drag and ease their propagation through snow.

The struts elevate the rider and motor 17, which have a substantial frontal area, above the snow, again, to minimize the drag imposed by the snow on the snowfoil ski-bob, and to reduce the amount of snow ingested by the motor.

At this point some practical design considerations related to the snowfoil ski-bob will be reviewed.

When propagating through soft snow the ski-bob plows a narrow channel. In powdery snow this channel collapses immediately, where in better structured snow the channel has a longer longevity. In either case it is preferred to locate the struts, by design, so that they pass within, or as adjacent to the channel as possible, to minimize further the struts's drag. This is especially true in the case of the motor strut which tends to be relatively wide when it carries the drive means for coupling the motor to the tread.

Snow tends to interfere with the operation of the motor, which in the case of a ski-bob is often an air-cooled internal combustion engine, in several ways. Snow particals tend to contribute to icing of the carburetor and air cooling passages, leading to engine malfunction and overheating respectively. In addition, snow tends to generate a host of secondary problems, entering and later freezing up various mechanisms like the throttle linkage, the recoil starter etc. By raising the engine on a strut the amount of snow ingested by the engine and its mechanism is drastically reduced and so are the problems associated therewith.

The frame, the struts the front ski and the body of the propulsion illustrated in the FIGS. lend themselves to economical manufacturing methods, such as injection molding of reinforced plastic.

While the present invention was illustrated with a single embodiment, it is understood that modification and substitution can be made within the scope of the claims and without departing from the spirit of the invention.

I claim:

1. In a power driven snowfoil ski-bob for moving in soft snow, comprising in combination:
   a front steerable ski and a rear propulsion unit, each having a limited frontal area and a substantial under surface area,
   a frame adapted to support a rider,
   a motor for propelling said propulsion unit,
   struts for connecting said front ski and said propulsion unit to said motor to other parts of said ski-bob,
   the improvement wherein said motor is carried elevated above the propulsion unit and the snow on a strut having a substantially narrower frontal area than said motor so that the drag imposed by the snow on said ski-bob is minimized.

2. A snowfoil ski-bob as in claim 1, wherein said motor is supported on one end of a motor strut which is connected at its other end to said propulsion unit.

3. A snowfoil ski-bob as in claim 1, wherein said struts have a streamlined configuration to ease their propagation through snow and minimize the drag between said struts and said snow.